(12) United States Patent
Kuribayashi et al.

(10) Patent No.: US 7,075,875 B2
(45) Date of Patent: Jul. 11, 2006

(54) DISK EVALUATION DEVICE

(75) Inventors: Hiroki Kuribayashi, Tsurugashima (JP); Shogo Miyanabe, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 127 days.

(21) Appl. No.: 10/496,674

(22) PCT Filed: Apr. 1, 2003

(86) PCT No.: PCT/JP03/04178

§ 371 (c)(1),
(2), (4) Date: May 26, 2004

(87) PCT Pub. No.: WO03/085650

PCT Pub. Date: Oct. 16, 2003

(65) Prior Publication Data

US 2004/0257953 A1  Dec. 23, 2004

(30) Foreign Application Priority Data

Apr. 5, 2002  (JP) ............................. 2002-103524

(51) Int. Cl.
*G11B 7/00* (2006.01)

(52) U.S. Cl. .............................. 369/59.21; 369/59.22; 369/53.42

(58) Field of Classification Search ............. 369/53.32, 369/53.33, 53.42, 59.21, 59.22
See application file for complete search history.

(56) References Cited

U.S. PATENT DOCUMENTS 5,764,611 A * 6/1998 Watanabe .................. 386/113

FOREIGN PATENT DOCUMENTS

| JP | 10-282165 A | 10/1998 |
|---|---|---|
| JP | 11-259985 A | 9/1999 |
| JP | 2001-6181 A | 1/2001 |
| JP | 2002-8324 A | 1/2002 |

OTHER PUBLICATIONS

Heitaro Nakajima et al., Zukai Compact Disk Dokuhon (revised 3rd edition), Ohmsha, Ltd., May 20, 1999, pp. 44, 54-57.
Edited by Torikeppusu Kikakubu, Torikeppusu Sosho (TR) 7, "Jisedai Hikari Disk Gijutsu", Kabushiki Kaisha Torikeppusu, Feb. 1, 1997, pp. 83-84.

* cited by examiner

*Primary Examiner*—Nabil Hindi
(74) *Attorney, Agent, or Firm*—Sughrue Mion, PLLC

(57) ABSTRACT

The invention has an object to provide a disk evaluation apparatus capable of performing a highly reliable disk evaluation even on a recording disk on which information is recorded in high density. Amplitude-limited read sample value sequence are obtained by limiting read sample value sequence to a predetermined amplitude limit value, the read sample value sequence obtained by sampling a read signal read out from the recording disk as timed to a clock having the same frequency as that of a channel clock. Where a gap between a maximum sample value and a minimum sample value of the amplitude-limited read sample value sequence is equivalent to a predetermined distance of high-frequency wavelength, the maximum sample value and the minimum sample value are increased thereby to obtain high-frequency enhanced read sample value sequence enhanced at the high region thereof. The high-frequency enhanced read sample value sequence are converted to an analog high-frequency enhanced read signal as timed to the clock having the same frequency as that of the channel clock. Only components having frequencies equal to or smaller than a predetermined cutoff frequency are extracted from the high-frequency enhanced read signal so as to obtain an evaluation read signal. The evaluation read signal is binarized based on a predetermined threshold value to obtain a binary signal, which is outputted as a disk evaluation value.

7 Claims, 7 Drawing Sheets

000# DISK EVALUATION DEVICE

TECHNICAL FIELD

The present invention relates to a disk evaluation apparatus for performing quality evaluation of recording disks.

BACKGROUND ART

Presently, the quality of a manufactured recording disk is evaluated based on jitter occurring on a signal read from the recording disk. However, as the recording density of information recorded on the recording disk increases, the read signal is not only decreased in the S/N ratio of high frequency components but also becomes more susceptible to intersymbol interference. Therefore, a greater jitter than an intrinsic jitter is detected from the read signal acquired from the recording disk on which the information is recorded in high density. This results in a problem that the recording disk cannot be evaluated correctly.

The invention is directed to a solution to such a problem. An object of the invention is to provide a disk evaluation apparatus capable of performing a highly reliable disk evaluation even on the recording disk on which the information is recorded in high density.

DISCLOSURE OF THE INVENTION

According to the invention, a disk evaluation apparatus for evaluating a recording disk on which a modulation signal is recorded, the modulation signal obtained by performing a predetermined modulation processing on information data according to a channel clock, the apparatus includes: information reading means for acquiring a read signal by reading out the modulation signal from the recording disk; an A/D converter for obtaining read sample value sequence by sampling the read signal as timed to a clock having the same frequency as that of the channel clock; amplitude limiter means for obtaining amplitude-limited read sample value sequence by limiting the individual sample values of the read sample value sequence to a predetermined amplitude limit value or less; a high-frequency enhancement filter operative to increase a maximum sample value and a minimum sample value when a gap between the maximum sample value and the minimum sample value of the amplitude-limited read sample value sequence is equivalent to a predetermined distance of a high-frequency wavelength, thereby obtaining high-frequency enhanced read sample value sequence enhanced at the high region thereof; a D/A converter for converting the high-frequency enhanced read sample value sequence to an analog high-frequency enhanced read signal as timed to the clock having the same frequency as that of the channel clock; a lowpass filter operative to extract, from the high-frequency enhanced read signal, only components having frequencies equal to or lower than a predetermined cutoff frequency, thereby obtaining an evaluation read signal; and a binarization circuit operative to binarize the evaluation read signal based on a predetermined threshold value thereby obtaining a binary signal, the apparatus considering a jitter of the binary signal as a disk evaluation value.

EMBODIMENT OF THE INVENTION

A preferred embodiment of the invention will be described below.

Figure 1:
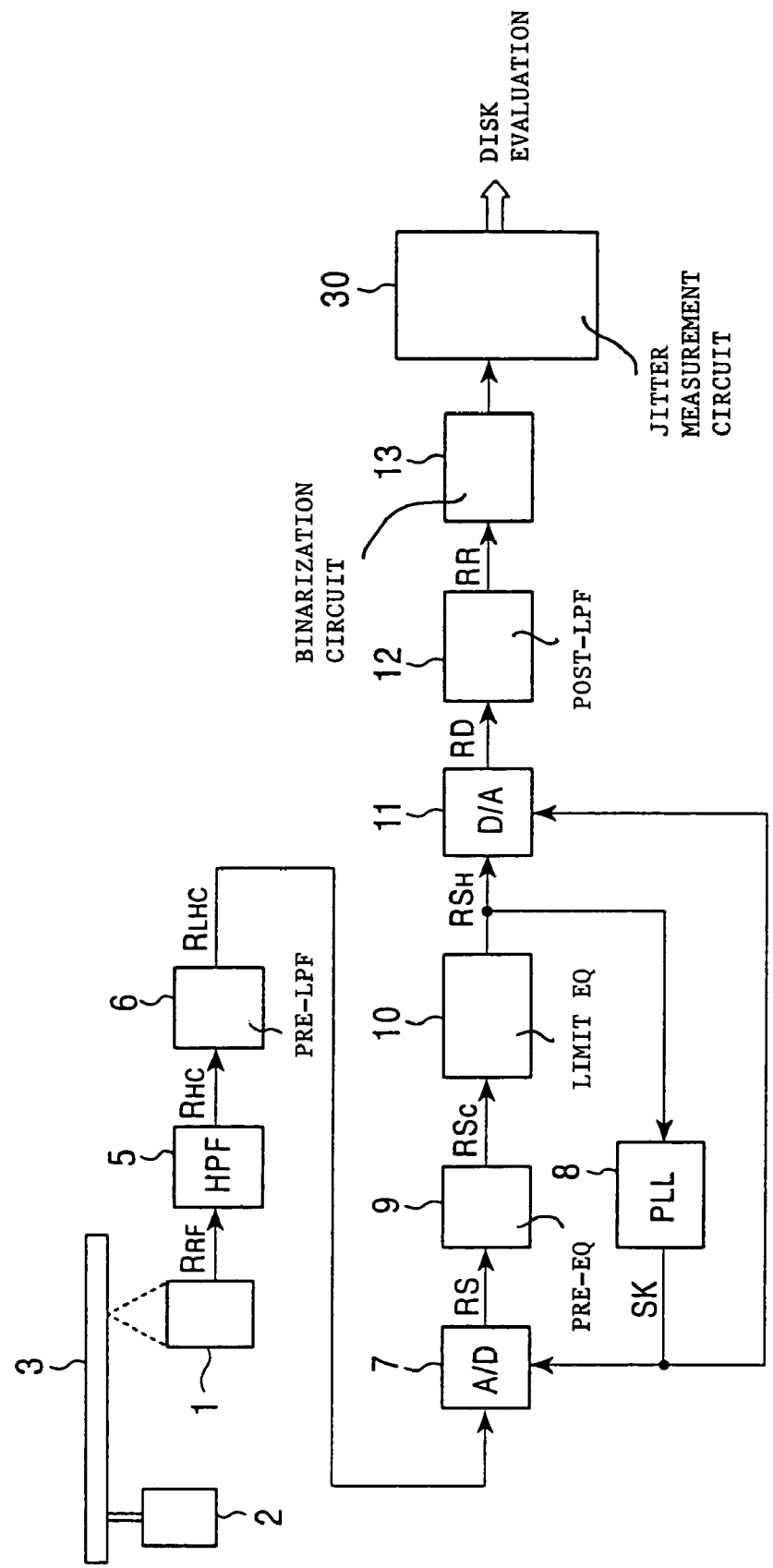
FIG. 1 is a diagram showing an arrangement of a disk evaluation apparatus according to the invention.

FIG. 1 is a diagram showing an arrangement of a disk evaluation apparatus according to the invention.

Referring to FIG. 1, a pickup 1 acquires a read signal $R_{RF}$ by photoelectrically converting a read light beam irradiated on and reflected from a recording surface of a recording disk 3 as an evaluation subject. The recording disk 3 is rotated by a spindle motor 2. Previously recorded on the recording disk 3 is a modulation signal representative of information data and obtained by an RLL (1,7) modulation processing performed according to a channel clock at 66 MHz, for example. A highpass filter 5 removes low region components from the aforesaid read signal $R_{RF}$ so as to supply a read signal $R_{HC}$ to a pre-lowpass filter 6. In order to obviate aliasing during a sampling operation performed by an A/D converter 7, the pre-lowpass filter 6 removes, from the read signal $R_{HC}$, high region components at ½ or more of a sampling frequency so as to supply a read signal $R_{LHC}$ to the A/D converter 7. The A/D converter 7 acquires read sample value sequence RS by sampling the read signal $R_{LHC}$ according to a sampling clock SK supplied from a PLL (phase locked loop) circuit 8 and then supplies the sample value sequence RS to a pre-equalizer 9. It is noted that the sampling clock SK has the same frequency as the channel clock described above. The pre-equalizer 9 obtains read sample value sequence $RS_C$ by removing, from such read sample value sequence RS, an intersymbol interference associated with transmission properties of an information reading system including the aforesaid pickup 1 and recording disk 3. Then, the pre-equalizer supplies the resultant read sample value sequence $RS_C$ to a limit equalizer 10. It is noted that the pre-equalizer 9 is a transversal filter having a tap coefficient such as [k, 1, 1, k].

The limit equalizer 10 performs a high-frequency enhancement processing on the aforesaid read sample value sequence $RS_C$ without increasing the intersymbol interference, thereby obtaining high-frequency enhanced read sample value sequence $RS_H$. The limit equalizer supplies the resultant sample value sequence to the PLL circuit 8 and a D/A converter 11

Figure 2:
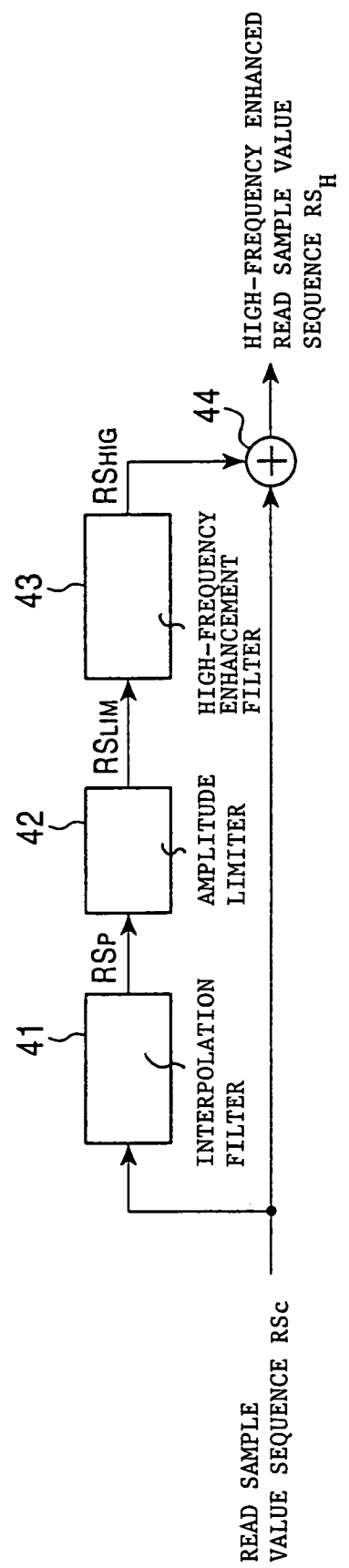
FIG. 2 is a diagram showing an internal arrangement of a limit equalizer 10.

FIG. 2 is a diagram showing an internal arrangement of the limit equalizer 10.

As shown in FIG. 2, the limit equalizer 10 includes an interpolation filter 41, an amplitude limiter circuit 42, a high-frequency enhancement filter 43, and an adder 44.

The interpolation filter 41 performs an interpolation operation on the aforesaid read sample value sequence $RS_C$ thereby obtaining sample value sequence which would be acquired by sampling the read signal read out from the recording disk 3 in an intermediate timing of a clock timing provided by the foresaid sampling clock SK. The interpolation filter 41 obtains interpolated read sample value sequence $RS_P$ by interpolating the resultant sample value sequence in the aforesaid read sample value sequence $RS_C$ and then supplies the interpolated read sample value sequence to the amplitude limiter circuit 42.

The amplitude limiter circuit 42 limits the amplitude of the interpolated read sample value sequence $RS_P$ to predetermined amplitude limit values $T_h$ and $-T_h$ thereby to. obtain amplitude-limited read sample value sequence $RS_{LIM}$, which are supplied to the high-frequency enhancement filter 43. In a case where the individual read sample values of the interpolated read sample value sequence $RS_P$ are in the range defined by the aforesaid amplitude limit values of $-T_h$ to $T_h$, the amplitude limiter circuit 42 directly supplies the interpolated read sample value sequence $RS_P$, as the aforesaid amplitude-limited read sample value sequence $RS_{LIM}$, to the high-frequency enhancement filter 43. In a case where the individual read sample values of the interpolated read. sample value sequence $RS_P$ are greater than the amplitude limit value $T_h$, the amplitude limiter circuit supplies a sequence of the amplitude limit value $T_h$, as the amplitude-limited read sample value sequence $RS_{LIM}$, to the high-frequency enhancement filter 43. On the other hand, in a case where the individual read sample values of the interpolated read sample value sequence $RS_P$ are smaller than the amplitude limit value $-T_h$, the amplitude limiter circuit supplies a sequence of the amplitude limit value $-T_h$, as the amplitude-limited read sample value sequence $RS_{LIM}$, to the high-frequency enhancement filter 43. In this process, the aforesaid amplitude limit values $T_h$ and $-T_h$ are each defined such that the individual samples are not subjected to the aforementioned amplitude limitation when a gap between the maximum sample and the minimum sample of the interpolated read sample value sequence $RS_P$ is equal to a predetermined distance of a high region wavelength or equal to the shortest run length 2T in the RLL (1,7) modulation. That is, the interpolated read sample value sequence $RS_P$ corresponding to the run length 2T are passed through the amplitude limiter circuit 42 as they are, and then outputted as the amplitude-limited read sample value sequence $RS_{LIM}$.

Figure 3:
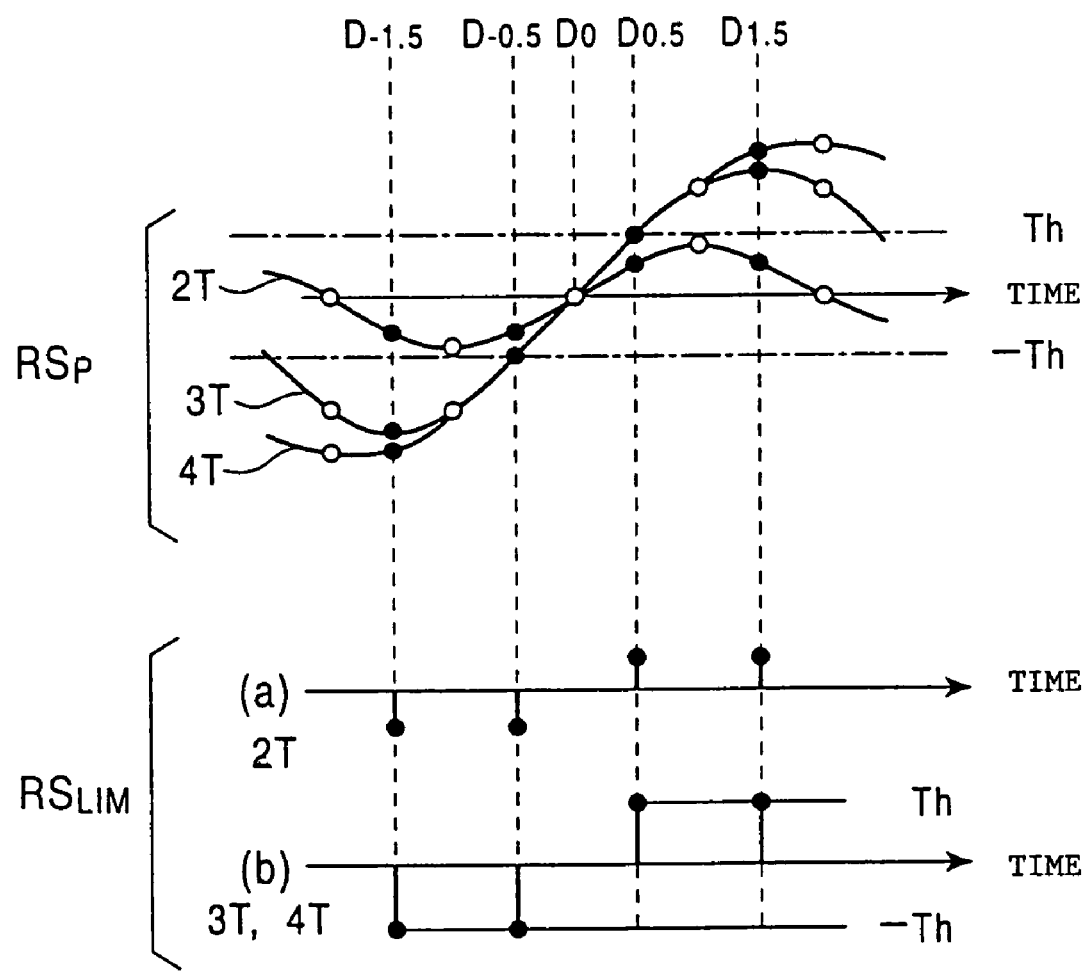
FIG. 3 is a diagram showing one example of interpolated read sample value sequence $RS_P$ and one example of amplitude-limited read sample value sequence $RS_{LIM}$.

The high-frequency enhancement filter 43 generates high-frequency read sample value sequence by exclusively enhancing the level of the sample value sequence corresponding to the shortest run length 2T, which are included in the aforesaid amplitude-limited read sample value sequence $RS_{LIM}$. The high-frequency enhancement filter supplies the resultant high-frequency read sample value sequence to the adder 44. The high-frequency enhancement filter 43 is a transversal filter having a tap coefficient of [-k, k, k, -k], for example. According to such an arrangement, the high-frequency enhancement filter 43 determines a value at Time $D_0$ based on values at Times $D_{-1.5}$, $D_{-0.5}$, $D_{0.5}$ and $D_{1.5}$ included in the amplitude-limited read sample value sequence $RS_{LIM}$, as shown in FIGS. 3(a) and 3(b), for example. Thus, the high-frequency enhancement filter sequentially outputs the determined value as a high-frequency read sample $RS_{HIG}$, which is expressed as: $RS_{HIG} = (-k) \cdot Y_{-1.5} + k \cdot Y_{-0.5} + (-k) \cdot Y_{1.5}$ $Y_{-1.5}$: an amplitude-limited read sample at Time $D_{-1.5}$ in $RS_{LIM}$ $Y_{-0.5}$: an amplitude-limited read sample at Time $D_{-0.5}$ in $RS_{LIM}$ $Y_{0.5}$: an amplitude-limited read sample at Time $D_{0.5}$ in $RS_{LIM}$ $Y_{1.5}$: an amplitude-limited read sample at Time $D_{1.5}$ in $RS_{LIM}$ As shown in FIG. 3(a), the amplitude-limited read samples at Times $D_{-1.5}$ and $D_{-0.5}$ (or Times $D_{0.5}$ and $D_{1.5}$) corresponding to the run length 2T are substantially equal to each other. As shown in FIG. 3(b), on the other hand, both the amplitude-limited read samples at Times $D_{-1.5}$ and $D_{-0.5}$ (or Times $D_{0.5}$ and $D_{1.5}$) corresponding to a run length 3T or 4T are at the amplitude limited value $-T_h$ (or $T_h$) because of the operation of the amplitude limiter circuit 42. Accordingly, a high-frequency read sample obtained at a zero cross point $D_0$ is maintained at a constant value even if the tap coefficient k of the high-frequency enhancement filter 43 is increased in order to provide a strong high-frequency enhancement. Thus is obviated the intersymbol interference.

The adder 44 adds the high-frequency read sample value sequence $RS_{HIG}$ to the read sample value sequence $RS_C$ supplied from the aforesaid pre-equalizer 9 and then, outputs the addition results as the high-frequency enhanced read sample value sequence $RS_H$.

According to the aforementioned arrangement, the limit equalizer 10 accomplishes the high region enhancement by increasing the maximum sample value and the minimum sample value of the aforesaid read sample value sequence $RS_C$ when the gap between the maximum and minimum sample values of the read sample value sequence $RS_C$ is equivalent to the predetermined distance of the high region wavelength or to the run length 2T in the RLL (1,7) modulation.

Figure 4:
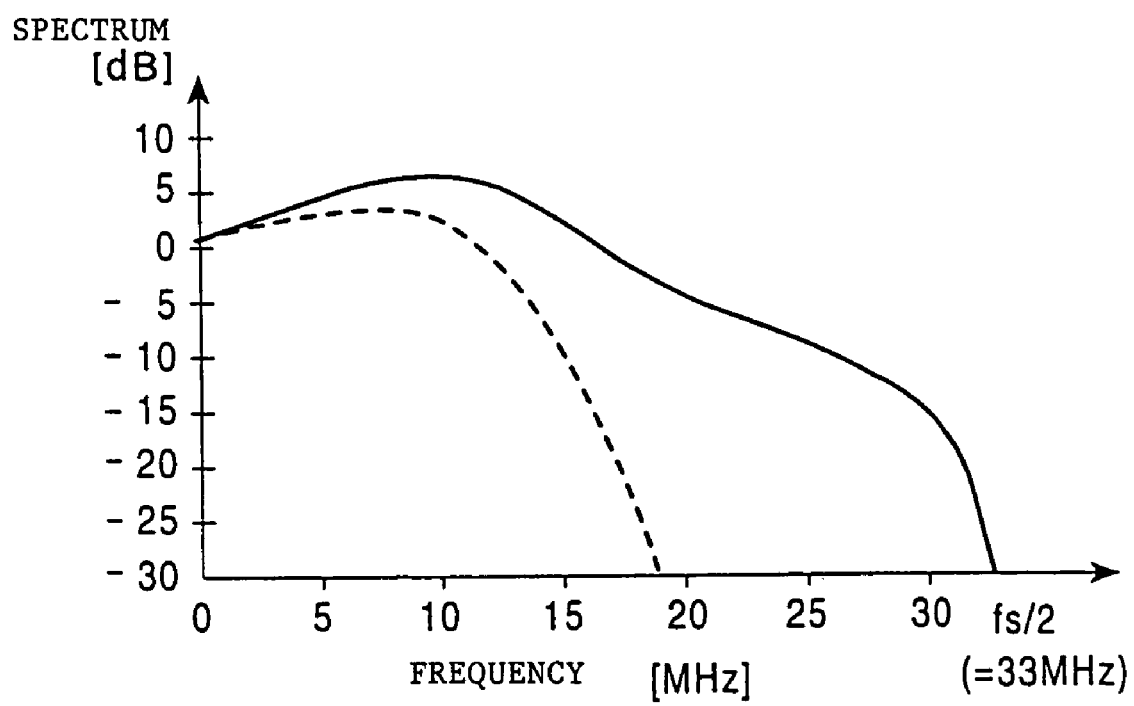
FIG. 4 is a graph showing an output from the limit equalizer 10 in contrast to an output from an equalizer which does not perform high region enhancement.

FIG. 4 is a graph showing spectrum (indicated by a solid line) of the high-frequency enhanced read sample value sequence $RS_H$ obtained through the high-frequency enhancement processing performed by the aforesaid limit equalizer 10, in contrast to spectrum (indicated by a broken line) of read sample value sequence obtained by an equalizer which does not perform such a high region enhancement. As shown in FIG. 4, an output (indicated by the solid line) from the limit equalizer 10 includes harmonic components which do not appear on an output (indicated by the broken line) from the equalizer which does not perform the high region enhancement.

The PLL circuit 8 generates a clock signal which is corrected for phase errors produced in the aforesaid high-frequency enhanced read sample value sequence $RS_H$ and has the same frequency (66 MHz) as the aforesaid channel clock. The PLL circuit supplies the resultant clock signal, as the aforesaid sampling clock SK, to the aforesaid A/D converter 7, the aforesaid D/A converter 11 and a jitter measurement circuit 30. The D/A converter 11 converts the aforesaid high-frequency enhanced read sample value sequence $RS_H$ to an analog signal in a timing according to the sampling clock SK and supplies the resultant signal, as a high-frequency enhanced read signal RD, to a post-lowpass filter 12.

The post-lowpass filter 12 removes an aliasing component (described later) present in such a high-frequency enhanced read signal RD thereby extracting only a baseband component included in the aforesaid high-frequency enhanced read sample value sequence $RS_H$. Then, the post-lowpass filter supplies the resultant signal, as an evaluation read signal RR, to a binarization circuit 13.

A specific operation of the post-lowpass filter 12 will be described as below.

Figure 5:
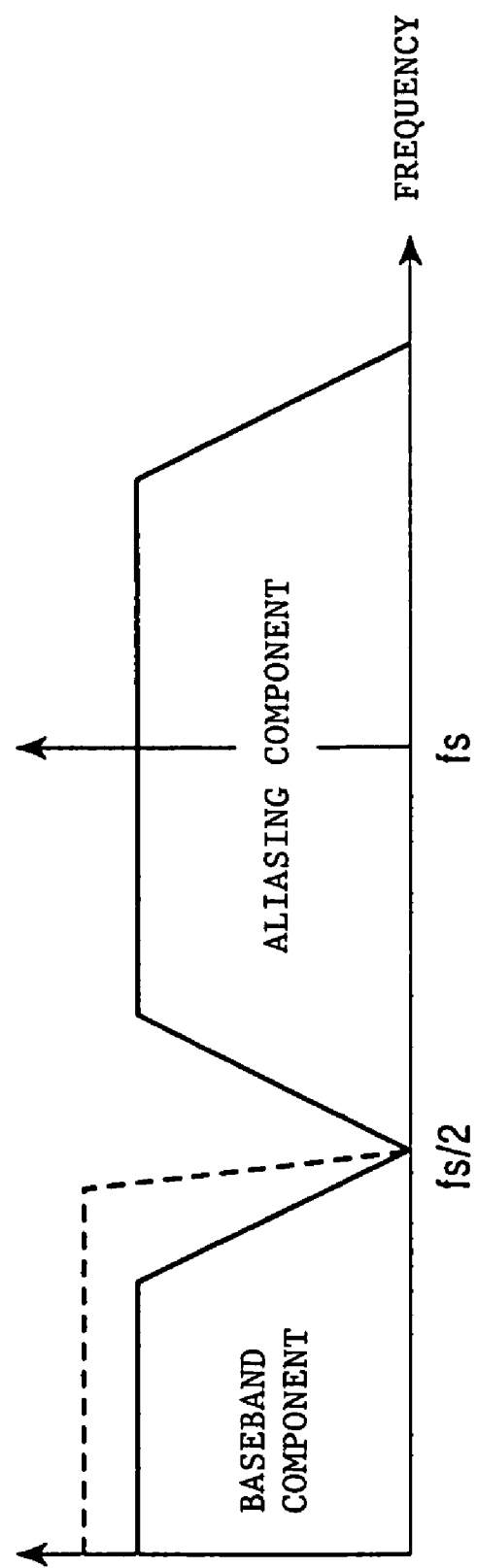
FIG. 5 is a diagram showing a frequency band of a high-frequency enhanced read signal RD inputted to a post-lowpass filter 12.

FIG. 5 is a diagram showing a frequency band of the high-frequency enhanced read signal RD inputted to the post-lowpass filter 12.

The high-frequency enhanced read signal RD is obtained by converting the aforesaid high-frequency enhanced read sample value sequence $RS_H$ to the analog signal as timed to the sampling clock SK. In the high-frequency enhanced read signal RD, therefore, the baseband component of the high-frequency enhanced read sample value sequence $RS_H$ exists in a frequency band of ½ or less of the sampling frequency fs (66 MHz) whereas the aliasing component thereof exists in a frequency band of (½)·fs or more, as shown in FIG. 5. Hence, the post-lowpass filter 12 takes an advantage of its cutoff properties as indicated by a broken line in FIG. 5 such as to remove the aliasing component of (½)·fs or more from the aforesaid high-frequency enhanced read sample value sequence $RS_H$. Thus, the post-lowpass filter 12 extracts only the baseband component of the high-frequency enhanced read sample value sequence $RS_H$ from the high-frequency enhanced read signal RD and then, outputs the resultant signal as the evaluation read signal RR.

Figure 6:
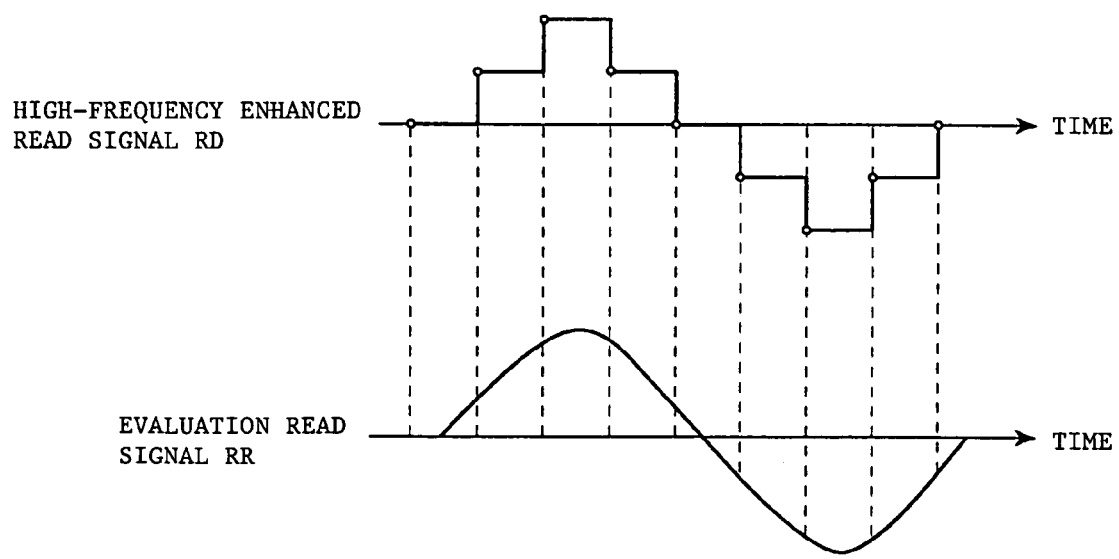
FIG. 6 is a diagram showing an exemplary waveform of the high-frequency enhanced read signal RD inputted to the post-lowpass filter 12 and an exemplary waveform of an evaluation read signal RR outputted from the post-lowpass filter 12.

FIG. 6 is a diagram showing an exemplary waveform of the high-frequency enhanced read signal RD inputted to the post-lowpass filter 12 and an exemplary waveform of the evaluation read signal RR outputted from the post-lowpass filter 12.

As shown in FIG. 6, the high-frequency enhanced read signal RD is obtained by the D/A converter 11 and hence, the waveform of the signal is shaped like steps due to the 0-order hold performance of the converter. Therefore, the high-frequency enhanced read signal is not suited for the jitter measurement. On this account, the post-lowpass filter 12 is used to remove the aliasing component of the high-frequency enhanced read sample value sequence $RS_H$ which exists in the high-frequency enhanced read signal RD, thereby generating the evaluation read signal RR having a smooth waveform as shown in FIG. 6.

Figure 7:
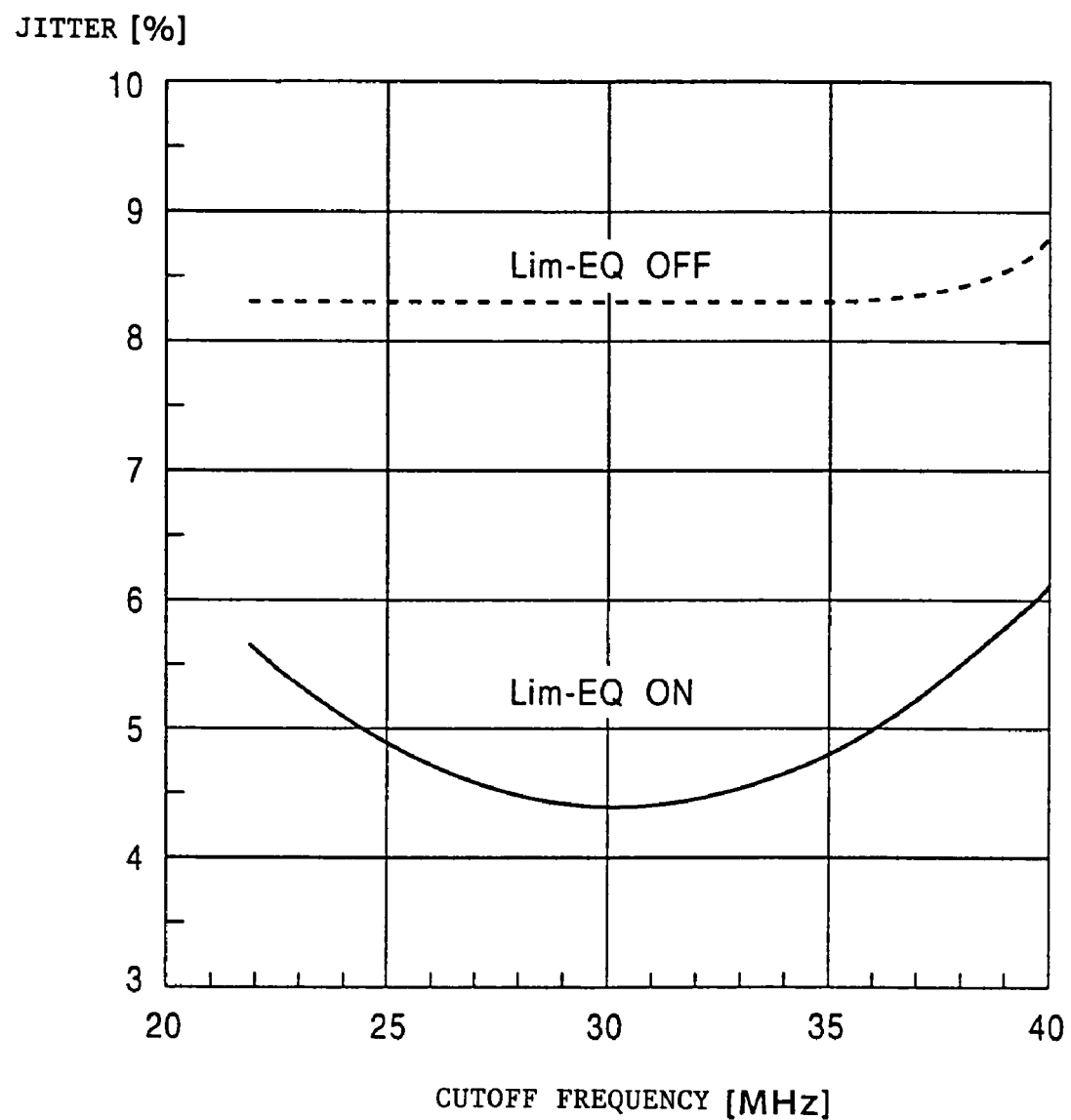
FIG. 7 is a graph showing a corresponding relation between the cutoff frequency of the post-lowpass filter 12 and the amount of jitter in a case where information data are RLL (1,7) modulated based on a channel clock at 66 MHz and recorded on a recording disk 3.

FIG. 7 is a graph showing a corresponding relation between the cutoff frequency of the post-lowpass filter 12 and the amount of jitter when the information data are RLL (1,7) modulated according to the channel clock at 66 MHz and recorded on the recording disk 3.

In the example shown in FIG. 7, an objective lens (not shown) mounted in the pickup 1 has the following numerical aperture NA and a wavelength λ:

NA=0.85

Wavelength λ=405 nm

In a case where the limit equalizer 10 is not used (indicated by a broken line), little jitter variations are observed if the cutoff frequency of the post-lowpass filter 12 is set to a value smaller than ½ of the frequency of the channel clock, or 33 MHz. In the aforementioned case where the limit equalizer 10 is used, however, the post-lowpass filter 12, the cutoff frequency of which is set to a value greater than 30 MHz, cannot fully attenuate the aliasing component of the high-frequency enhanced read sample value sequence $RS_H$, as shown in FIG. 5. In consequence, the amount of jitter is increased as shown in FIG. 7. If the cutoff frequency of the post-lowpass filter 12 is set to a value smaller than 30 MHz, the harmonic component in the high-frequency enhanced read sample value sequence $RS_H$, as indicated by the solid line in FIG. 4, is attenuated so that the amount of jitter is increased as shown in FIG. 7.

In short, the amount of jitter is minimized where the post-lowpass filter 12 has the cutoff frequency in the vicinity of 30 MHz. In addition, if the post-lowpass filter 12 has the cutoff frequency in the vicinity of 30 MHz, it is ensured that even if the post-lowpass filter 12 is more or less varied in the cutoff frequency, the variations of the jitter in conjunction with the cutoff frequency variations are insignificant, as shown in FIG. 7.

Hence, it is preferred to set the cutoff frequency of the post-lowpass filter 12 in the vicinity of 30 MHz when the aforesaid limit equalizer 10 is employed for the evaluation of the recording disk 3 on which the information data are recorded as RLL (1,7) modulated according to the channel clock at 66 MHz. It is noted here that the cutoff frequency in the vicinity of 30 MHz is defined to include allowable variations ±10% of the cutoff frequency from the viewpoint of suppressing the variations of the amount of jitter to 0.2% or less. That is, the cutoff frequency in the vicinity of 30 MHz is in the range of 27 to 33 MHz. In a case where the disk is evaluated at a double speed (based on a channel clock at a frequency of 132 MHz), the cutoff frequency of the post-lowpass filter 12 may preferably be set in the vicinity of 60 MHz.

In short, the cutoff frequency fc of the post-lowpass filter 12 may be decided such that fc/fclk may give a value of about 5/11, provided that the frequency of the channel clock is represented by fclk[MHz] and the cutoff frequency of the post-lowpass filter 12 is represented by fc[MHz].

In a case where the variations ±10% of the cutoff frequency are taken into consideration, the cutoff frequency fc of the post-lowpass filter 12 may be so decided as to satisfy:

$$9/22 \leq fc/fclk \leq 1/2.$$

The binarization circuit 13 generates a binary signal of a predetermined high voltage when the evaluation read signal RR supplied from the aforesaid post-lowpass filter 12 is greater than a predetermined threshold value or a binary signal of a predetermined low voltage in a case where the evaluation read signal RR is smaller than the predetermined threshold value. Then, the binarization circuit 13 supplies the resultant binary signal to the jitter measurement circuit 30. The jitter measurement circuit 30 takes measurement on the variation of time difference between an edge timing of such a binary signal and a clock timing of a reference clock signal. That is, the jitter measurement circuit 30 takes measurements on the amount of jitter and then, outputs the measurement results as the disk evaluation value.

Thus, the jitter measurement circuit 30 takes measurement on the read signal which is obtained by performing the high region enhancement only on the read sample value sequence equivalent to the shortest run length by means of the limit equalizer 10 without causing the intersymbol interference, followed by removing the aliasing component by means of the post-lowpass filter 12, the aliasing component occurring during the D/A conversion.

According to the disk evaluation apparatus of the invention, it is possible to evaluate the recording disk with high reliability even if the information is recorded on the recording disk in high density. When the limit equalizer is applied to the disk evaluation apparatus, the limit equalizer is allowed to fully present its effect to alleviate jitter by setting the cutoff frequency of the post-lowpass filter in a manner specified by the invention, although no consideration has been given to the cutoff frequency of the post-lowpass filter.

Furthermore, even if the cutoff frequency of the post-lowpass filter is varied to some degrees, the amount of jitter variations is insignificant. Consequently, the disk evaluation apparatus can provide a highly reliable jitter evaluation which does not vary from one apparatus to another.

The invention claimed is:

1. A disk evaluation apparatus for evaluating a recording disk on which a modulation signal is recorded, the modulation signal obtained by performing a predetermined modulation processing on information data according to a channel clock, the apparatus characterized by including:

information reading means for acquiring a read signal by reading out said modulation signal from said recording disk;

an A/D converter for obtaining read sample value sequence by sampling said read signal as timed to a clock having the same frequency as that of said channel clock;

amplitude limiter means for obtaining amplitude-limited read sample value sequence by limiting the individual sample values of said read sample value sequence to a predetermined amplitude limit value or less;

a high-frequency enhancement filter operative to increase a maximum sample value and a minimum sample value when a gap between said maximum sample value and said minimum sample value of said amplitude-limited read sample value sequence is equivalent to a predetermined distance of a high-frequency wavelength, thereby obtaining high-frequency enhanced read sample value sequence enhanced at the high region thereof;

a D/A converter for converting said high-frequency enhanced read sample value sequence to an analog high-frequency enhanced read signal as timed to a clock having the same frequency as that of said channel clock;

a lowpass filter operative to extract, from said high-frequency enhanced read signal, only components having frequencies equal to or lower than a predetermined cutoff frequency, thereby obtaining an evaluation read signal; and a binarization circuit operative to binarize said evaluation read signal based on a predetermined threshold value thereby obtaining a binary signal, the apparatus considering a jitter of said binary signal as a disk evaluation value.

2. A disk evaluation apparatus according to claim 1, characterized in that the frequency of said channel clock is represented by fclk[MHz] and said cutoff frequency is represented by fc[MHz], fc/fclk gives a value of about 5/11.

3. A disk evaluation apparatus according to claim 2, characterized in that said channel clock has a frequency of 66 MHz whereas said cutoff frequency is at 30 MHz.

4. A disk evaluation apparatus according to claim 1, characterized in that the frequency of said channel clock is represented by fclk[MHz] and said cutoff frequency is represented by fc[MHz], the following expression holds:

$$9/22 \leq fc/fclk \leq 1/2.$$

5. A disk evaluation apparatus according to claim 1, characterized in that said modulation processing is an RLL (1,7) modulation processing.

6. A disk evaluation apparatus according to claim 1, characterized in that said amplitude limit value is greater than said maximum sample value when the gap between the maximum sample value and the minimum sample value of said amplitude-limited read sample value sequence is equivalent to the predetermined distance of the high-frequency wavelength.

7. A disk evaluation apparatus according to claim 1, characterized in that said high-frequency enhancement filter is a transversal filter having a tap coefficient of [−k, k, k, −k].

* * * * *